UNITED STATES PATENT OFFICE 2,183,337

PROCESS OF INHIBITING DUSTING OF ARSENIOUS OXIDE AND PRODUCT THEREOF

Melville F. Perkins, Salt Lake City, Utah, assignor to American Smelting and Refining Company, New York, N. Y., a corporation of New Jersey No Drawing. Application January 9, 1937, Serial No. 119,836

6 Claims. (Cl. 23—243)

In many industrial operations, such as in the glass industry, in the preparation of insecticides and other materials of toxic properties having arsenic as a constituent, there are used large amounts of arsenious oxide, or so-called "white arsenic." This material, occurring in solid form, possesses normally the property of dusting considerably which increases substantially the industrial hazards of handling this material, due to the toxic properties of the arsenical dust.

One object of the present invention is to reduce the dusting properties of arsenious oxide so as to reduce the hazard to operators in preparing, packing, and using this material.

A further object of the invention is to reduce or eliminate the above-indicated dust hazard incident to the handling of arsenious oxide without reducing or diluting the toxicity of the product.

Further objects and advantages of the present improvements will become apparent as the description proceeds and the features of novelty will be pointed out in particularity in the appended claims.

Generally speaking, the invention comprises the diminution of arsenious oxide dust resulting from the handling of arsenious oxide to the point where it will no longer be a hazard to the operators handling the same, by incorporating with the arsenious oxide sufficient arsenic pentoxide to create adherence between the particles of arsenious oxide by virtue of atmospheric moisture absorbed by the pentoxide.

In view of the fact that in many instances it is undesirable to introduce substantial quantities of an element other than arsenic into the arsenious oxide, or to diminish the toxic properties thereof, solid arsenic pentoxide ($As_2O_5$) is a very suitable deliquescent addition agent, as it absorbs moisture readily and it may be incorporated into arsenious oxide without imparting deleterious or foreign properties thereto.

In practice, the amount of arsenic pentoxide used should be within such limits as will render the arsenious oxide substantially dustless while avoiding such quantities as will make the product sensibly wet. In practice, it is found that the content of arsenic pentoxide lies between approximately 0.05% and 0.1% by weight of the arsenious oxide, best results being obtained around 0.08% by weight of $As_2O_5$, there being shown at 0.1% content a visible appearance of dampness in the product unless there is a low moisture content in the air, the atmospheric moisture content being a contributing factor in determining the range of $As_2O_5$ additions. However, in any event, the additions are well within the limits of high grade white arsenic.

The arsenic oxide ($As_2O_5$) is water soluble, so finished products must be protected from leaching actions. However, a high atmospheric humidity does no harm, since the increase in moisture of the arsenic is only a few hundredths of a per cent. The moisture content automatically stays at a suitable value. This moisture content of the dustless arsenic is by no means as much as it appears to be by casual examination. The dustless product contains only a few hundredths of a per cent more moisture than the dusting product. As a matter of fact, it is much easier to screen dustless arsenic through a 325 mesh screen than to screen the dusting product, which fact is evidence of low moisture content.

In preparing the improved dustless arsenious oxide of the present invention, the finely divided arsenic pentoxide, may be added as such and intimately mixed with the arsenic trioxide. Preferably, the arsenic pentoxide may be ground with, or just added to, a portion of the arsenious oxide so as to produce a rich mixture thereof, and this rich mixture then intimately mixed with the remainder of the arsenious oxide, or the arsenic pentoxide may be applied in a water solution, as a spray, or as a finely divided powder. Any method which will give a superficial oxidation producing $As_2O_5$ will produce also inhibition of dusting; and the arsenic pentoxide inhibitor works equally well on coarse crystalline arsenic, or on finely divided material having 90% or more of the particles smaller than 325 screen mesh, or on the impure arsenious oxide known as black dust, which may be sprayed with the inhibiting agent as it is removed from the arsenic kitchens, so that the advantages of a non-dusting arsenical product may be obtained by the manufacturer as well as by the consumer.

The invention is illustrated by the following specific example:

Preliminary tests having indicated that a mixture of arsenious oxide and arsenic oxide containing 0.08% by weight of the latter was the most desirable as to appearance and non-dusting, for the arsenic at hand, 50 lbs. of a commercial, high-grade arsenious oxide were mixed with 20 grams (0.04 lb.) of arsenic pentoxide by first mixing the arsenic oxide with 1 lb. of the arsenious oxide for one hour in a glass jar of a laboratory ball mill containing only a few pebbles to facilitate mixing and thereby produce simply a mixing action and not a grinding.

These mixed oxides were then added to the remainder of the white arsenic in a porcelain mill 18 inches in diameter by 16 inches long, and rotated for one hour. No balls or tumbling agents were used in this operation.

Inspection of the mix showed a product of excellent non-dusting properties, and it was not necessary to allow the product time to pick up a few hundredths of a per cent of moisture to become dustless, it being a dustless product when examined at the end of an hour's mixing in the rotating drum; however, when working at locations of low atmospheric humidity, it may be necessary to allow time for a slight moisture absorption, or to supply the moisture by any suitable means.

The exact moisture content of this product was not determined directly, but it was between 0.05% and 0.07% at 105° C. inasmuch as the arsenious oxide alone had a moisture content at 105° C. of 0.05% and when mixed with 0.10% arsenic pentoxide, the moisture content was only 0.07% although the mixture had a damp appearance.

The arsenious oxide alone (0.05% moisture) appeared to be dry and dusted very badly, whereas the 0.10% $As_2O_5$-containing product not only exhibited no tendency to dust but appeared to be too damp. With the 0.08% content of $As_2O_5$, the product appears to be satisfactory with respect to moisture and showed no tendency to dust. Very bad dusting was encountered with a content of 0.02% of $As_2O_5$, slight dusting with 0.06%, and no dusting with 0.08% of the $As_2O_5$.

It will be apparent, therefore, that the dusting tendency is very markedly affected by small variations in the amount of arsenic pentoxide contained in the arsenious oxide and by small variations in the moisture content.

The use of arsenic pentoxide as the dust-inhibiting agent is of advantage in that it does not cause abnormal action under nitration of the arsenical material, the presence of the arsenic pentoxide not complicating the operation since it in itself is the end product of the nitration process.

While the results of the tests thus far made indicate that the inhibiting of the dusting is due to control or modification of the moisture content of the treated arsenious oxide, there is some evidence that the inhibiting of the dusting may be influenced by other properties, perhaps electrostatic, of the arsenic pentoxide which are not dependent on the presence of traces of moisture. Accordingly, it is desired to claim the advantages of the use of such agents as arsenic pentoxide although it is not possible at present to explain all of the details connected with inhibiting of dusting.

What is claimed is:

1. The process for inhibiting dusting properties of arsenious oxide which comprises commingling arsenic pentoxide therewith in quantity sufficient to absorb enough moisture in the said arsenious oxide to inhibit its dusting, but insufficient to impart any substantial amount of sensible dampness thereto.

2. The process of producing substantially dustless arsenious oxide which comprises intimately incorporating therein from approximately 0.06% to approximately 0.10% of the weight thereof of arsenic pentoxide.

3. The process of producing dustless arsenious oxide which comprises intimately incorporating therein approximately 0.08% of the weight thereof of arsenic pentoxide.

4. Substantially dustless white arsenic comprising arsenious oxide and approximately 0.06% to approximately 0.1% arsenic pentoxide as a dust inhibitor.

5. Dustless white arsenic comprising arsenious oxide and approximately 0.08% arsenic pentoxide as a dust inhibitor.

6. Arsenious oxide containing an amount of arsenic pentoxide sufficient to inhibit dusting of the arsenious oxide but insufficient to produce sensible dampness therein.

MELVILLE F. PERKINS.